US011691083B2

(12) United States Patent
Hewes et al.

(10) Patent No.: US 11,691,083 B2
(45) Date of Patent: Jul. 4, 2023

(54) SCAVENGER HUNT FACILITATION

(71) Applicant: Photo Butler Inc., Easton, MA (US)

(72) Inventors: Gerald Hewes, Lexington, MA (US);
Carlson Craig, Wakefield, MA (US);
Zhikang Ding, Malden, MA (US);
Joseph C. Cuccinelli, Jr., Needham, MA (US); David Benaim, Newton Centre, MA (US); Joe Regan, Boston, MA (US); Tricia Chang, Somerville, MA (US); Andrew P. Goldfarb, Brookline, MA (US)

(73) Assignee: Photo Butler Inc., Boston, MA (US)

( * ) Notice: Subject to any disclaimer, the term of this patent is extended or adjusted under 35 U.S.C. 154(b) by 0 days.

(21) Appl. No.: 17/294,989

(22) PCT Filed: Nov. 26, 2019

(86) PCT No.: PCT/US2019/063232
§ 371 (c)(1),
(2) Date: Jun. 30, 2021

(87) PCT Pub. No.: WO2020/112759
PCT Pub. Date: Jun. 4, 2020

(65) Prior Publication Data
US 2022/0072429 A1 Mar. 10, 2022

Related U.S. Application Data

(60) Provisional application No. 62/771,542, filed on Nov. 26, 2018.

(51) Int. Cl.
*A63F 13/655* (2014.01)
*A63F 13/216* (2014.01)
(Continued)

(52) U.S. Cl.
CPC .......... *A63F 13/655* (2014.09); *A63F 13/216* (2014.09); *A63F 13/217* (2014.09); *G06V 10/225* (2022.01); *G06V 30/10* (2022.01)

(58) Field of Classification Search
CPC .... A63F 13/655; A63F 13/216; A63F 13/217; G06V 10/225; G06V 30/10
See application file for complete search history.

(56) References Cited

U.S. PATENT DOCUMENTS

| | | | | |
|---|---|---|---|---|
| 5,038,393 | A | * | 8/1991 | Nanba .................... G06V 10/24 382/175 |
| 6,102,406 | A | * | 8/2000 | Miles ..................... A63F 9/183 434/350 |

(Continued)

OTHER PUBLICATIONS

International Search Report for PCT/US2019/063232, dated Mar. 23, 2020, 2 pages.

(Continued)

*Primary Examiner* — David L Lewis
*Assistant Examiner* — Matthew D Hoel
(74) *Attorney, Agent, or Firm* — Danielson Legal LLC

(57) ABSTRACT

Methods and systems for facilitating a scavenger hunt. The systems and methods described herein involve receiving at an interface a list of a plurality of attractions, and communicating the list of the plurality of attractions to at least one device associated with a participant over a network. Scavenger hunt participants may then gather imagery of the required attractions. The systems and methods described herein then involve receiving imagery from the at least one participant and executing at least one computer vision procedure to determine whether the received imagery includes at least one of the plurality of attractions.

16 Claims, 3 Drawing Sheets

(51) Int. Cl.
*A63F 13/217* (2014.01)
*G06V 10/22* (2022.01)
*G06V 30/10* (2022.01)

(56) References Cited

U.S. PATENT DOCUMENTS

| | | | |
|---|---|---|---|
| 6,609,713 B1* | 8/2003 | Heffron | A63F 3/0478 273/429 |
| 7,258,614 B1* | 8/2007 | Kates | A63F 13/10 273/461 |
| 7,614,958 B2* | 11/2009 | Weston | A63G 31/00 473/133 |
| 8,131,118 B1 | 3/2012 | Jing et al. | |
| 8,758,136 B2* | 6/2014 | Briggs | G07F 17/32 463/42 |
| 8,790,180 B2* | 7/2014 | Barney | A63F 13/69 463/42 |
| 8,915,785 B2* | 12/2014 | Barney | A63F 13/24 463/39 |
| 9,186,585 B2* | 11/2015 | Briggs | A63F 13/23 |
| 9,468,854 B2* | 10/2016 | Briggs | A63F 13/77 |
| 9,474,962 B2* | 10/2016 | Barney | A63F 13/235 |
| 9,511,274 B2* | 12/2016 | Kelly | G06V 10/225 |
| 9,536,162 B2* | 1/2017 | Lee | G06V 10/225 |
| 9,679,547 B1* | 6/2017 | Zünd | G10H 1/368 |
| 9,731,194 B2* | 8/2017 | Briggs | G07F 17/3223 |
| 9,773,324 B1* | 9/2017 | Ackley | A63F 13/323 |
| 9,802,127 B2* | 10/2017 | Rouille | A63F 13/216 |
| 9,814,973 B2* | 11/2017 | Barney | A63F 13/69 |
| 9,861,887 B1* | 1/2018 | Briggs | A63F 13/25 |
| 9,921,052 B2* | 3/2018 | Ikenoue | A63F 13/422 |
| 10,118,092 B2* | 11/2018 | Alpay | G06V 10/225 |
| 10,207,178 B2* | 2/2019 | Lavache | A63F 13/219 |
| 10,245,506 B2* | 4/2019 | Lavache | H04N 5/23258 |
| 10,261,849 B1* | 4/2019 | Burke | G06F 11/0793 |
| 10,262,642 B2* | 4/2019 | Zund | G06T 13/20 |
| 10,300,374 B2* | 5/2019 | Briggs | A63F 13/00 |
| 10,307,671 B2* | 6/2019 | Barney | A63F 13/245 |
| 10,398,966 B2* | 9/2019 | Kelly | G06V 30/194 |
| 10,427,045 B2* | 10/2019 | Thompson | A63F 13/25 |
| 10,454,857 B1* | 10/2019 | Blackstock | H04L 51/52 |
| 10,500,482 B2* | 12/2019 | Lavache | H04N 5/23258 |
| 10,512,845 B2* | 12/2019 | Chai | A63F 13/58 |
| 10,885,619 B2* | 1/2021 | Hewes | G06T 7/0002 |
| 11,055,321 B2* | 7/2021 | Cuccinelli, Jr. | G06F 16/287 |
| 11,064,267 B2* | 7/2021 | Toksoz | A63F 13/355 |
| 11,103,773 B2* | 8/2021 | Rathod | G06T 19/003 |
| 11,110,366 B2* | 9/2021 | Barki | A63F 13/795 |
| 11,170,471 B2* | 11/2021 | Otterness | A63F 13/53 |
| 11,182,616 B2* | 11/2021 | Mulligan | A63F 13/63 |
| 11,207,599 B2* | 12/2021 | Elbert | G06V 40/10 |
| 11,325,043 B2* | 5/2022 | Pollock | A63F 13/655 |
| 11,410,487 B2* | 8/2022 | Ciardi | G07F 17/3244 |
| 11,410,488 B2* | 8/2022 | Ciardi | G07F 17/3286 |
| 11,524,239 B2* | 12/2022 | Elbert | A63F 13/213 |
| 2008/0252012 A1* | 10/2008 | Montz | A63F 3/00145 273/292 |
| 2009/0036186 A1 | 5/2009 | Benco et al. | |
| 2012/0052954 A1 | 3/2012 | Zhu et al. | |
| 2012/0235357 A1* | 9/2012 | Chambers | A63F 3/00643 273/429 |
| 2013/0343599 A1* | 12/2013 | Lee | G06V 10/225 382/100 |
| 2014/0091522 A1* | 4/2014 | Kelly | A63F 1/12 382/161 |
| 2014/0171039 A1* | 6/2014 | Bjontegard | H04L 67/535 455/414.1 |
| 2014/0200078 A1* | 7/2014 | Rouille | A63F 13/42 463/31 |
| 2014/0280316 A1 | 9/2014 | Ganick et al. | |
| 2015/0124084 A1* | 5/2015 | Ikenoue | G06T 7/20 348/135 |
| 2015/0336010 A1* | 11/2015 | Wiederkehr | A63F 13/335 463/42 |
| 2016/0107084 A1* | 4/2016 | Kuri | A63F 13/332 463/42 |
| 2016/0337505 A1* | 11/2016 | Bjontegard | A63F 13/332 |
| 2016/0337827 A1 | 11/2016 | Bjontegard | |
| 2016/0367899 A1 | 12/2016 | Boncyk | |
| 2017/0173449 A1* | 6/2017 | Kelly | G06V 10/50 |
| 2017/0278273 A1* | 9/2017 | Ackley | G06V 10/225 |
| 2017/0287456 A1* | 10/2017 | Zund | A63F 13/92 |
| 2017/0319951 A1* | 11/2017 | Lavache | A63F 13/40 |
| 2017/0319959 A1* | 11/2017 | Lavache | H04N 17/02 |
| 2017/0324952 A1* | 11/2017 | Lavache | A63F 13/25 |
| 2018/0021671 A1 | 1/2018 | Liesenfelt et al. | |
| 2018/0036640 A1* | 2/2018 | Drakoln | G06T 19/006 |
| 2018/0065034 A1* | 3/2018 | Alpay | H04N 21/4223 |
| 2018/0078858 A1* | 3/2018 | Chai | A63F 13/216 |
| 2018/0139507 A1* | 5/2018 | Toksoz | A63F 13/355 |
| 2018/0345129 A1* | 12/2018 | Rathod | G06Q 20/0655 |
| 2018/0349703 A1* | 12/2018 | Rathod | G06Q 20/3276 |
| 2018/0350144 A1* | 12/2018 | Rathod | H04W 4/021 |
| 2019/0015747 A1* | 1/2019 | Thompson | A63F 13/53 |
| 2019/0099686 A1* | 4/2019 | Barki | G06V 10/225 |
| 2020/0114252 A1* | 4/2020 | Eurlings | G06K 9/6274 |
| 2020/0184225 A1* | 6/2020 | Mulligan | A63F 13/63 |
| 2020/0186897 A1* | 6/2020 | Dareddy | A63F 13/497 |
| 2020/0188795 A1* | 6/2020 | Mulligan | A63F 13/79 |
| 2020/0342480 A1* | 10/2020 | Ramsey | A63F 13/795 |
| 2020/0349800 A1* | 11/2020 | Ciardi | G06Q 30/0209 |
| 2020/0349801 A1* | 11/2020 | Ciardi | G07F 17/3223 |
| 2021/0133905 A1* | 5/2021 | Dekel | A63F 3/064 |
| 2021/0224950 A1* | 7/2021 | Otterness | G06V 20/635 |
| 2021/0255328 A1* | 8/2021 | Sanjeev | A63F 13/28 |
| 2021/0260485 A1* | 8/2021 | Elbert | G06K 9/00536 |
| 2021/0275924 A1* | 9/2021 | Lisaj | A63F 13/63 |
| 2021/0342587 A1* | 11/2021 | Huang | G07F 17/3241 |
| 2021/0394060 A1* | 12/2021 | Yilmazcoban | A63F 13/86 |
| 2022/0005156 A1* | 1/2022 | Otterness | G06V 10/56 |
| 2022/0058415 A1* | 2/2022 | LittleSun | G06K 9/6263 |
| 2022/0072429 A1* | 3/2022 | Hewes | A63F 13/213 |
| 2022/0080301 A1* | 3/2022 | Flanagan | G06V 10/22 |
| 2022/0080321 A1* | 3/2022 | Elbert | G06K 9/00536 |
| 2022/0233961 A1* | 7/2022 | Pollock | A63F 13/65 |

OTHER PUBLICATIONS

Written Opinion for PCT/US2019/063232, dated Mar. 23, 2020, 3 pages.
Extended European Search Report for European Application No. 19889326.5, PCT/US2019/063232, dated Sep. 9, 2022, 9 pages.

* cited by examiner

SCAVENGER HUNT FACILITATION

CROSS REFERENCE TO RELATED APPLICATIONS

The present application is the national phase of International (PCT) Patent Application No. PCT/US2019/063232, filed internationally on Nov. 26, 2019, and claims the benefit of U.S. provisional application No. 62/771,542, filed on Nov. 26, 2018, the entire disclosure of which is incorporated by reference as if set forth in its entirety herein.

TECHNICAL FIELD

The present application generally relates to systems and methods for facilitating a scavenger hunt and, more particularly but not exclusively, to systems and methods for facilitating a scavenger hunt involving imagery gathered by one or more scavenger hunt participants.

BACKGROUND

People are always looking for fun and exciting ways to visit or otherwise experience locations, objects, places, items of interest, or other types of attractions. Often times, locations such as cities with multiple tourist attractions offer maps to tourists that highlight certain locations the tourists may be interested in visiting. Similarly, museums may issue brochures or maps highlighting exhibits for visitors to see. However, these regions or locations of interest generally do not provide exciting ways for people to visit or otherwise experience these items, objects, or locations of interest.

A need exists, therefore, for systems and methods that offer more exciting ways to experience locations, objects, places, or items of interest.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for facilitating a scavenger hunt. The method includes receiving at an interface a list of a plurality of attractions, communicating the list of the plurality of attractions to at least one device associated with a participant over a network, receiving imagery from the at least one participant over the network, and executing, using a processor executing instructions stored on memory to determine whether the received imagery includes at least one of the plurality of attractions, at least one of a computer vision procedure to analyze content of the received imagery and a location procedure to detect where the imagery was gathered.

In some embodiments, the method further includes receiving location data regarding the imagery for analysis by the location procedure to at least assist in determining whether the received imagery includes at least one of the plurality of attractions.

In some embodiments, executing the at least one computer vision procedure further includes executing a neural network to determine content of the received imagery.

In some embodiments, the plurality of attractions include at least one of a point of interest, a person, a monument, a landmark, a location, and a building.

In some embodiments, the method further includes receiving a required time period, and determining whether the imagery was gathered during the required time period.

In some embodiments, the received imagery includes at least one of a photograph file, a live photograph file, and a video file.

In some embodiments, the method further includes executing an optical character recognition tool to identify text within the imagery and recognize meaning of the identified text.

In some embodiments, the method further includes issuing a credit to the at least one participant upon determining the received imagery includes the plurality of attractions.

In some embodiments the method further includes providing feedback to at least one participant regarding whether the received imagery includes at least one of the plurality of attractions.

According to another aspect, embodiments relate to a system for facilitating a scavenger hunt. The system includes an interface for receiving a list of a plurality of attractions; and a processor executing instructions stored on memory and configured to: communicate the list of the plurality of attractions to at least one device associated with a participant over a network, receive imagery from the at least one participant over the network, and execute, to determine whether the received imagery includes at least one of the plurality of attractions, a computer vision procedure to analyze content of the received imagery, and a location procedure to detect where the imagery was gathered.

In some embodiments, the processor is further configured to receive location data regarding the imagery for analysis by the location procedure to at least assist in determining whether the received imagery includes at least one of the plurality of attractions.

In some embodiments, the processor is further configured to execute a neural network to determine content of the received imagery.

In some embodiments, the plurality of attractions include at least one of a point of interest, a person, a monument, a landmark, a location, and a building.

In some embodiments, the interface is further configured to receive a required time period, and the processor is further configured to determine whether the imagery was gathered during the required time period.

In some embodiments, the received imagery includes at least one of a photograph file, a live photograph file, and a video file.

In some embodiments, the processor is further configured to execute an optical character recognition tool to identify text within the imagery and recognize meaning of the identified text.

In some embodiments, the system is further configured to issue a credit to the at least one participant upon determining the received imagery includes the plurality of attractions.

In some embodiments, the processor is further configured to provide feedback to at least one participant regarding whether the received imagery includes at least one of the plurality of attractions.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
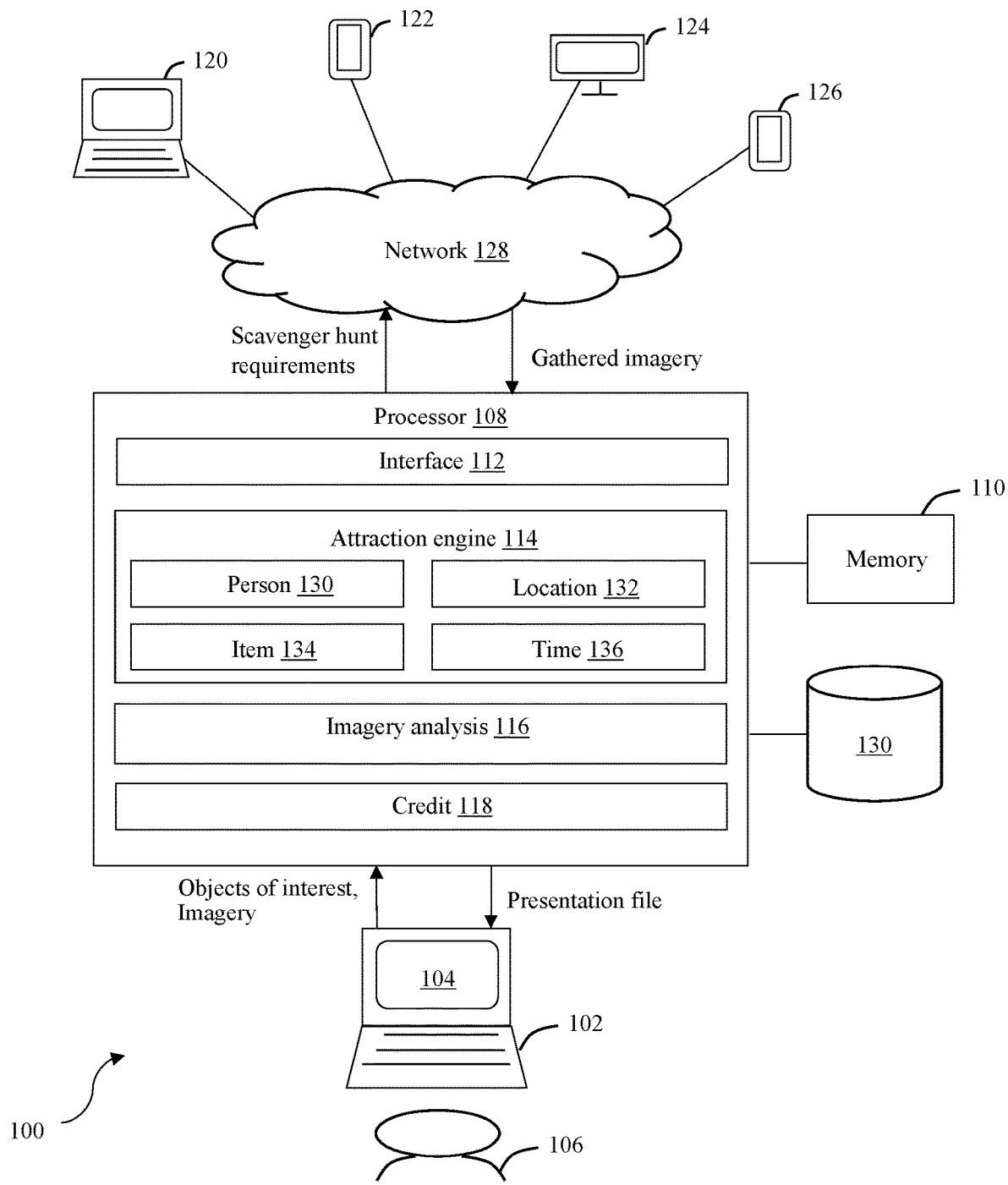
FIG. 1 illustrates a system for facilitating a scavenger hunt in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The embodiments described herein provide novel ways to create and facilitate a scavenger hunt for one or more participants. A user may first define parameters or requirements of a scavenger hunt, such as by specifying certain objects, items, people, monuments, locations, landmarks, or the like (for simplicity, "attractions"). The list of attractions may then be communicated to or otherwise viewed by one or more scavenger hunt participants, who will then attempt to gather imagery of the listed attractions. While this list may be communicated to one or more participants over one or more networks, attraction lists of a scavenger hunt may be previously-stored or otherwise accessible to participants through an application. Accordingly, in the context of the present application, the attraction list may be communicated to the participants in a variety of ways.

Imagery gathered by the participant(s) may then be communicated to one or more processors for analysis. The systems and methods described herein may rely on any one or more of computer vision procedures, machine learning procedures, optical character recognition (OCR) procedures, landmark or object data, time data, location data, or the like to analyze received imagery to determine whether the received imagery satisfies the scavenger hunt requirements.

Upon determining that one or more participants have gathered the required imagery, the systems and methods described herein may issue some type of reward to the successful participant(s). For example, the systems and methods described herein may issue a monetary reward, credits, gift cards, cryptocurrency, or the like, to a scavenger hunt participant that gathered the required imagery.

FIG. 1 illustrates a system 100 for facilitating a scavenger hunt in accordance with one embodiment. The system 100 may include a user device 102 executing a user interface 104 for presentation to a user 106. The user 106 may be a person interested in providing parameters for a scavenger hunt for one or more participants. For example, the user 106 may specify requirements regarding imagery to be captured in connection with the scavenger hunt.

The scavenger hunt requirements may vary and may depend on a number of factors. One factor may be the general location at which a scavenger hunt is to occur. For example, if a scavenger hunt were to take place in Washington D.C., required imagery may include imagery of the White House, the United States Capitol, the Washington Monument, and the Jefferson Memorial.

As another example, a scavenger hunt may generally be concentrated in a museum. In this case, the user 106 may specify certain exhibits at the museum of which participants must gather imagery (assuming imagery-gathering is permitted at the museum).

The scavenger hunts in accordance with the embodiments described herein are not limited to only capturing imagery of objects or items. Rather, scavenger hunts may require participants to gather imagery of people as well. For example, a scavenger hunt concentrated at a sporting event may require participants to gather imagery of a team's mascot.

A user 106 may define the scavenger hunt requirements in a variety of ways. In some embodiments, the user 106 may provide or otherwise select previously-obtained imagery of the target attractions. For example, to require imagery of a team's mascot as part of a scavenger hunt, the user 106 may provide or otherwise select previously-gathered imagery of the mascot. Similarly, to require imagery of the White House as part of a scavenger hunt, the user 106 may provide or otherwise select imagery of the White House.

In the context of the present application, the term "imagery" may refer to photographs, videos, mini clips, animated photographs, motion photos, or the like. In the context of the present application, the term "imagery portion" or the like may refer to an individual imagery file, such as a single photograph or video. Accordingly, a scavenger hunt may require several imagery portions, (e.g., one imagery portion of each attraction). In some scavenger hunts, the user 106 may require that each imagery portion includes the participant at the specified attraction. For example, a participant may be required to have their picture taken in front of an attraction as a "selfie" or by a fixed or photographer-manned camera.

The user 106 may also define different branches or other sets of requirements for the scavenger hunt. That is, participants may have options regarding which requirements they satisfy. For example, a scavenger hunt may require that participants either gather imagery of attraction A, or require the participants gather imagery of attractions B and C. Similarly, a requirement may be that a participant gather imagery of attractions in a certain order, or require that participants gather imagery of a certain attraction multiple times.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106.

The user device 102 may be in operable communication with one or more processors 108. The processor(s) 108 may be any hardware device capable of executing instructions stored on memory 110 to accomplish the objectives of the various embodiments described herein. The processor(s) 108 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located on a different computing device, perhaps at some remote location.

The processor 108 may execute instructions stored on memory 110 to provide various modules to accomplish the objectives of the various embodiments described herein. Specifically, the processor 108 may execute or otherwise include an interface 112, an attraction engine 114, an imagery analysis module 116, and a credit issuance module 118.

The memory 110 may be L1, L2, or L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for facilitating a scavenger hunt can be executed by the processor 108 to accomplish the features of various embodiments described herein.

The processor 108 may receive imagery from the user 106 as well as one or more participants 120, 122, 124, and 126 over one or more networks 128. The participants 120, 122, 124, and 126 are illustrated as devices such as laptops, smartphones, smartwatches and PCs, or any other type of device accessible by a participant and configured with an imagery gathering device (e.g., a camera) to gather imagery.

The systems and methods may analyze the imagery received from the user 106, participants 120, 122, 124, and 126, one or more databases 130, or some combination thereof in conjunction with the scavenger hunt. When the user 106 creates a scavenger hunt, they may specify who should be participants. For example, the user 106 may enter user names or credentials of people to participate in the scavenger hunt. An invitation may then be sent to the participants, along with the specified scavenger hunt requirements. The invitation may be sent, for example, over email and include a link inviting the participant to join the scavenger hunt.

The present application largely describes embodiments in which the user 106 of user device 102 defines parameters of a scavenger hunt, and then participants 120-26 gather and submit the required imagery. However, in some embodiments, the user 106 may also participate in the scavenger hunt along with the other participants 120-26.

The network(s) 128 may link the various assets and components with various types of network connections. The network(s) 128 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 128 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The database(s) 130 may store imagery and other data related to, for example, certain people (e.g., their facial features), places, objects of interest, items, or the like. In other words, the database(s) 130 may store data regarding attractions so that the imagery analysis module 116 (discussed below) can recognize these attractions in received imagery. The exact type of data stored in the database(s) 130 may vary as long as the features of various embodiments described herein may be accomplished.

In operation, a user 106 may specify one or more required attractions via the attraction engine 114. Specifically, the provided targets may specify the content required as part of a scavenger hunt. The attraction engine 114 may execute various sub-modules to define requirements of a scavenger hunt. These may include a person sub-module 130 to specify one or more people to be in the imagery, a location sub-module 132 to specify a location associated with the imagery, and an item sub-module 134 to specify an item required in imagery. There may be overlap as to whether a certain item of interest qualifies as an item, object, or location. For example, the White House may be classified as an object as well as a location.

The attraction engine 114 may also include a time sub-module 136 to specify a time period during which imagery must be gathered. Often times scavenger hunts may be required to be completed in a certain time or time window. Accordingly, the time sub-module 136 may enable the user 106 to specify time constraints for a scavenger hunt. For example, the user 106 may require that a scavenger hunt be open for one hour. That is, once a scavenger hunt starts, the participants 120-26 have one hour to gather the required imagery. As another example, a user 106 may create a scavenger hunt and specify that it must be completed from 1:00 PM-4:00 PM on a certain date.

The scavenger hunt requirements may be sent to the participants 120-26 over the network(s) 128. The participants 120-26 may be informed of the scavenger hunt by any suitable communication means, such as through text message, email, SMS, or some other type of alert. The incoming message may inform the participant(s) they have been invited to participate in the scavenger hunt, the timing of the scavenger hunt, attractions to be captured as part of the scavenger hunt, as well as any other requirements or parameters of the scavenger hunt.

The participant(s) 120-26 may then gather imagery of the required attractions. The user participant(s) 120-26 may use any suitable imagery gathering device such as a mobile device to gather the required imagery. The participants 120-26 may activate a link associated with the scavenger hunt such that all gathered imagery is automatically sent to the imagery analysis module 116 for analysis. Or, the gathered imagery may be sent to the imagery analysis module 116 at the conclusion of the scavenger hunt (e.g., at the expiration of a defined time range).

The processor interface 112 may receive imagery from the participant devices 120-26 and the user 106 (e.g., if the user 106 is participating in the scavenger hunt) in a variety of formats. The imagery may be sent via any suitable protocol or application such as, but not limited to, email, SMS text message, iMessage, Whatsapp, Facebook, Instragram, Snapchat, etc. The interface 112 may then communicate the imagery to the imagery analysis module 116.

Figure 2:
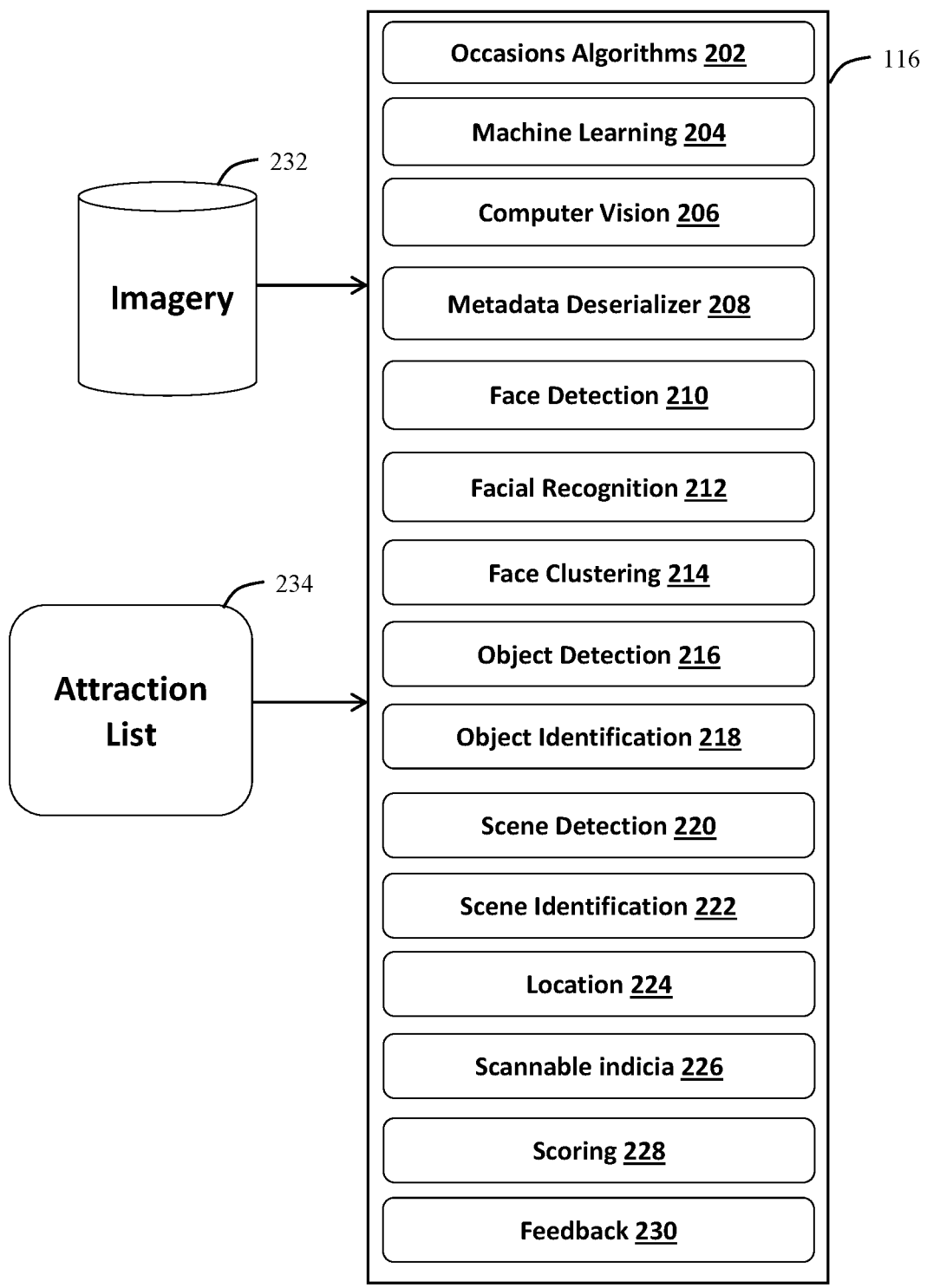
FIG. 2 illustrates the imagery analysis module of FIG. 1 in accordance with one embodiment.

The imagery analysis module 116 may execute one or more various sub-modules to analyze the imagery received from each of the participants 120-26. FIG. 2 illustrates the imagery analysis module 116 of FIG. 1 in more detail in accordance with one embodiment. The imagery analysis module 116 may include components that include, but are not limited to, occasions algorithms 202, a machine learning module 204, a computer vision module 206, a metadata deserializer 208, a face detection module 210, a facial recognition module 212, a face clustering module 214, an object detection module 216, an object identification module 218, a scene detection module 220, a scene identification module 222, a location module 224, a scannable indicia module 226, a scoring module 228, and a feedback module 230. Any of these components of the imagery analysis module 116 may, alone or in some combination, analyze received imagery 232 to determine if the imagery 232 includes the listed attractions 234.

The occasions algorithms 202 may include algorithms that recognize certain dates, calendar events, or other types of occasions such as those defined by the previously-discussed templates. These may recognize, for example, certain calendar dates that correspond to holidays.

The machine learning module 204 may implement a variety of machine learning procedures to identify the contents of received imagery 232. The machine learning module 204 may implement supervised machine learning techniques as well as unsupervised machine learning techniques.

The computer vision module 206 may implement a variety of vision techniques to analyze the content of the received imagery 232. These techniques may include, but are not limited to, scale-invariant feature transform (SIFT), speeded up robust feature (SURF) techniques, or the like. The exact techniques used may vary as long as they can analyze the content of the received imagery 232 to accomplish the features of various embodiments described herein.

The metadata deserializer 208 may receive a variety types of metadata (e.g., in a serialized form). This data may include, but is not limited to, EXIF data that specifies the formats for the received imagery 232. The deserializer 208 may then deserialize the received metadata into its deserialized form.

The face detection module 210 may execute a variety of facial detection programs to detect the presence of faces (and therefore people) in various imagery portions. The programs may include or be reliant on OPENCV and neural networks, for example. Again, these programs may execute on the user device 102 and/or on a server at a remote location. The exact techniques or programs may vary as long as they can detect facial features in imagery to accomplish the features of various embodiments described herein.

The facial recognition module 212 may execute a variety of facial recognition programs to identify certain people in various imagery portions. The facial recognition module 212 may be in communication with one or more databases 130 that store data regarding people and their facial characteristics. The facial recognition module 212 may use geometric-based approaches and/or photometric-based approaches, and may use techniques based on principal component analysis, linear discriminant analysis, elastic bunch graph matching, HMM, multilinear subspace learning, or the like.

Face attributes detected by either the face detection module 210 or the facial recognition module 212 may be Neural Network-generated facial embeddings and include, but are not limited to, Hasglasses, Hassmile, age, gender, and face coordinates for: pupilLeft, pupilRight, noseTip, mouthLeft, mouthRight, eyebrowLeftOuter, eyebrowLeftInner, eyeLeftOuter, eyeLeftTop, eyeLeftBottom, eyeLeftInner, eyebrowRightInner, eyebrowRightOuter, EyeRightInner, eyeRightTop eyeRightBottom, eyeRightOuter, noseRootLeft, noseRootRight, noseLeftAlarTop, noseRightAlarTop, noseLeftAlarOutTip, noseRightAlarOutTip, upperLipTop, upperLipBottom, underLipTop, underLipBottom.

The face clustering module 214 may, once the facial recognition module 212 identifies a certain person or a group of people in an imagery portion, group the imagery portion as being part of imagery associated with the certain person or the certain group of people. That is, an imagery portion may be one of many identified as including a certain person or a certain group of people.

The object detection module 216 may detect various objects present in an imagery portion. For example, the object detection module 216 may execute one or more of various techniques (e.g., using the computer vision module 206) to distinguish between an object in an imagery portion and the background of an imagery portion.

The object identification module 218 may then classify or otherwise recognize the object as a certain item. For example, the object identification module 218 may analyze objects (e.g., by their shape, size, color, etc.) to determine if they constitute a required attraction. The object identification module 218 may also compare data regarding the detected objects (e.g., their shape and size) to data in the database 130 to determine if the detected object matches an object stored in the database 130 and therefore constitutes a required attraction.

The scene detection module 220 may gather data that corresponds to the scene of an imagery portion. This may include data that indicates the context of an imagery portion such as whether the imagery portion includes people, was taken indoors, outdoors, during the day, during the night, etc. This data may be useful in determining whether an imagery portion satisfies a scavenger hunt requirement.

The scene identification module 222 may be in communication with the scene detection module 220 and receive data regarding the scene of an imagery portion. The scene identification module 222 may compare the received data to data in the database 130 to determine whether it is indicative of a certain context, which may be useful in determining whether an imagery portion satisfies a scavenger hunt requirement.

The location module 224 may receive location data related to the gathered imagery. For example, an imagery portion may be tagged with location data such as GPS data that relates to where the imagery portion was taken. This location data may be gathered through any appropriate GPS technology configured with a participant's imagery gathering device.

The location data may indicate whether an imagery portion is likely or unlikely to include an attraction. For example, location data that an imagery portion that is taken in proximity to the White House may provide support for an imagery portion including the White House. On the other hand, a photograph that appears to include the White House, but was taken in Boston, would be classified as not including the White House. In other words, GPS data may at the very least help determine whether it is more or less likely that a particular imagery portion includes an attraction.

The location module 224 may rely on GPS signals, signal triangulation, RFID/Bluetooth beacons, Access Point IDs, or the like to determine locations associated with the received imagery. The exact type of data or technique used to obtain this location data may vary as long as the objectives of the embodiments described herein may be accomplished.

The scannable indicia module 226 may receive data regarding a scanned bar code, QR code, or some other type of scannable indicia. For example, certain attractions such as items, locations, or the like, may be marked with these types of scannable indicia. Accordingly, participants may be required to scan these indicia to confirm they have actually visited the associated attraction.

The scoring module 228 may assign each imagery portion a score that represents whether (and to what degree) an imagery portion satisfies a scavenger hunt requirement. Accordingly, portions of imagery that have, say, higher scores or scores above a threshold may be more likely to be determined to satisfy a scavenger hunt requirement.

The feedback module 230 may provide feedback to a participant regarding their provided imagery. For example, the feedback module 230 may offer suggestions to a participant regarding how to take better imagery. For example, based on the analysis of a received imagery portion, the feedback module 228 may instruct a participant to take a picture of an attraction with better lighting, instruct the participant to move closer to an item or object, to zoom in on an object, or the like.

For example, there may be requirements regarding the quality of imagery gathered. These may include aesthetic thresholds or other types of requirements regarding what must be in the imagery. Accordingly, the feedback module 230 may provide instructions regarding how to gather imagery that satisfies any aesthetical thresholds.

Referring back to FIG. 1, the credit issuance module 118 may then issue one or more credits or some type of reward to participants that completed the scavenger hunt. These credits may be transmitted to an account associated with a participant, and may be a monetary value, a gift card, a credit, a cryptocurrency amount, or the like.

The system 100 may be configured to issue credits 118 in a variety of ways. For example, the first participant that finishes gathering imagery of the required attractions may be the only participant that receives a credit. As another example, the participant that gathers imagery of the most amount of the required attractions during a specified time window may be the only participant that receives a credit. As yet another example, more than one participant may receive a credit, with more credits going to participants who gathered more imagery of the required attractions than others.

Figure 3:
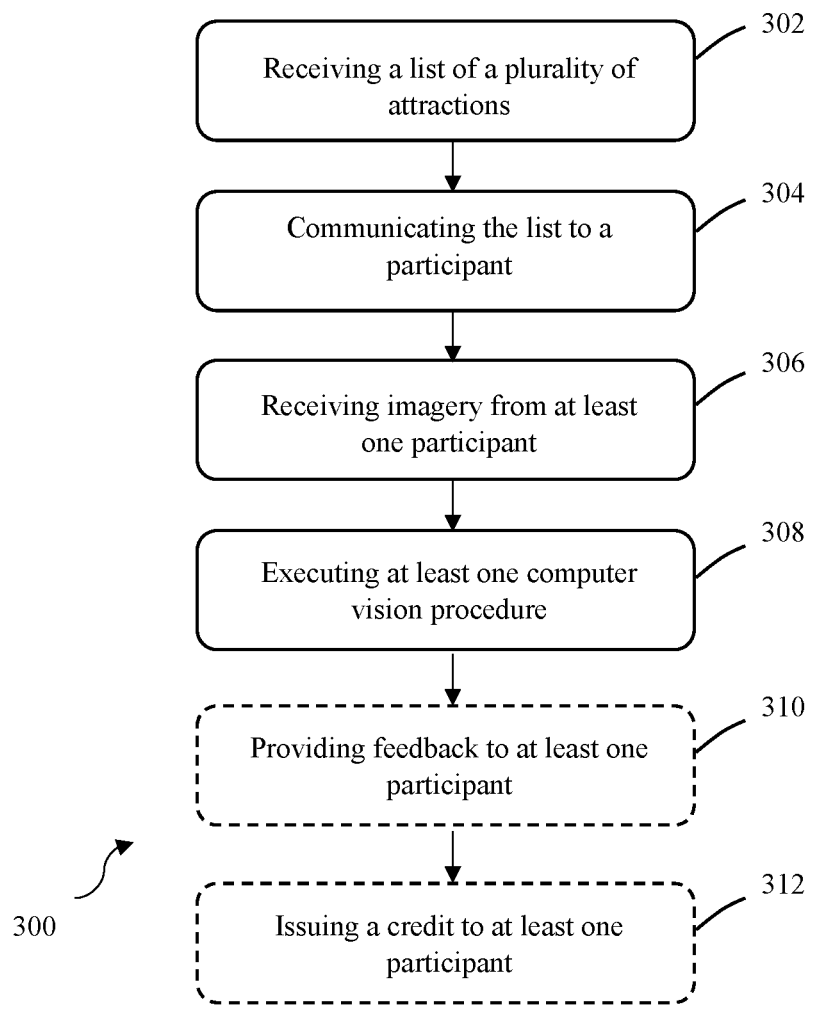
FIG. 3 depicts a flowchart of a method for facilitating a scavenger hunt in accordance with one embodiment.

FIG. 3 depicts a flowchart of a method 300 for facilitating a scavenger hunt in accordance with one embodiment. The system 100 of FIG. 1, or components thereof, may perform the steps of method 300.

Step 302 involves receiving at an interface a list of a plurality of attractions. These attractions may include any one or more of a person, a building, a monument, a landmark, an object, an item, an exhibit, or any other sort of attraction to be captured as part of a scavenger hunt. This list may be provided by a user such as the user 106 or otherwise by someone interested in facilitating a scavenger hunt.

Step 304 involves communicating the list of the plurality of attractions to at least one device associated with a participant over a network. Accordingly, the user may send the required attractions to one or more participants. In some embodiments, the user may be a teacher or a field trip monitor, and the participants may be students who are instructed to gather imagery of the required attractions.

The list of the attractions may be communicated to the participants in a variety of ways. For example, and as discussed above, the list may be communicated via text message, email, SMS, through social media, or the like. The message may include a link that, upon activation by a recipient, allows the recipient to become a participant in the scavenger hunt.

Step 306 involves receiving imagery from the at least one participant over the network. Step 306 may be performed in a variety of ways. For example, once a participant joins the scavenger hunt, their imagery-gathering device (e.g., a mobile device) may be configured to transmit imagery portions over a network to a processor such as the processor 108 of FIG. 1 as the imagery portion is taken. Or, the participants may review their gathered imagery before they opt to transmit their imagery to the processor 108 for analysis.

Step 308 involves executing at least one computer vision procedure using a processor executing instructions stored on memory to determine whether the received imagery includes at least one of the plurality of attractions. Step 308 may involve executing a variety of computer vision, machine learning procedures (e.g., neural networks), OCR techniques, or the like to identify and analyze the content of received imagery.

Step 310 is optional and involves providing feedback to at least one participant regarding whether the received imagery includes at least one of the plurality of attractions. This feedback may offer suggestions to a participant regarding how to take better imagery.

Step 312 is optional and involves issuing a credit to the at least one participant upon determining the received imagery includes at least some of the plurality of attractions. As discussed previously, this may include a reward for completing the scavenger hunt, and may include a monetary value, a gift certificate, a cryptocurrency value, or the like.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for facilitating a scavenger hunt, the method comprising:
   receiving at an interface a list of a plurality of attractions;
   communicating the list of the plurality of attractions to at least one device associated with a participant over a network;
   receiving imagery from the at least one participant over the network; and
   executing, using a processor executing instructions stored on memory to determine whether the received imagery includes at least one of the plurality of attractions, at least one of:
   a computer vision procedure to analyze content of the received imagery,
   a location procedure to detect where the imagery was gathered; and
   a scene detection procedure to gather data corresponding to a scene of the imagery, and a scene identification procedure to receive and analyze the data corresponding to the scene of the imagery to determine whether it is indicative of a certain context;

providing feedback to at least one participant regarding imagery received from the at least one participant, wherein the provided feedback includes a suggestion regarding how to gather imagery to satisfy the scavenger hunt.

2. The method of claim 1 further comprising receiving location data regarding the imagery for analysis by the location procedure to at least assist in determining whether the received imagery includes at least one of the plurality of attractions.

3. The method of claim 1 wherein executing the at least one computer vision procedure further includes executing a neural network to determine content of the received imagery.

4. The method of claim 1 wherein the plurality of attractions include at least one of a point of interest, a person, a monument, a landmark, a location, and a building.

5. The method of claim 1 further comprising:
receiving a required time period, and
determining whether the imagery was gathered during the required time period.

6. The method of claim 1 wherein the received imagery includes at least one of a photograph file, a live photograph file, and a video file.

7. The method of claim 1 further comprising executing an optical character recognition tool to identify text within the imagery and recognize meaning of the identified text.

8. The method of claim 1 further comprising issuing a credit to the at least one participant upon determining the received imagery includes the plurality of attractions.

9. A system for facilitating a scavenger hunt, the system comprising:
an interface for receiving a list of a plurality of attractions; and
a processor executing instructions stored on memory and configured to:
communicate the list of the plurality of attractions to at least one device associated with a participant over a network,
receive imagery from the at least one participant over the network, and
execute, to determine whether the received imagery includes at least one of the plurality of attractions:
a computer vision procedure to analyze content of the received imagery,
a location procedure to detect where the imagery was gathered, and
a scene detection procedure to gather data corresponding to a scene of the imagery, and a scene identification procedure to receive and analyze the data corresponding to the scene of the imagery to determine whether it is indicative of a certain context; and
provide feedback to at least one participant regarding imagery received from the at least one participant, wherein the provided feedback includes a suggestion regarding how to gather imagery to satisfy the scavenger hunt.

10. The system of claim 9, wherein the processor is further configured to receive location data regarding the imagery for analysis by the location procedure to at least assist in determining whether the received imagery includes at least one of the plurality of attractions.

11. The system of claim 9 wherein the processor is further configured to execute a neural network to determine content of the received imagery.

12. The system of claim 9 wherein the plurality of attractions include at least one of a point of interest, a person, a monument, a landmark, a location, and a building.

13. The system of claim 9 wherein the interface is further configured to receive a required time period, and the processor is further configured to determine whether the imagery was gathered during the required time period.

14. The system of claim 9 wherein the received imagery includes at least one of a photograph file, a live photograph file, and a video file.

15. The system of claim 9 wherein the processor is further configured to execute an optical character recognition tool to identify text within the imagery and recognize meaning of the identified text.

16. The system of claim 9 wherein the system is further configured to issue a credit to the at least one participant upon determining the received imagery includes the plurality of attractions.

* * * * *